United States Patent Office 3,634,391
Patented Jan. 11, 1972

3,634,391
PYRAZOLYL-AZO-INDOLE DYESTUFFS
John G. Fisher and Clarence A. Coates, Jr., Kingsport, Tenn., assignors to Eastman Kodak Company, Rochester, N.Y.
No Drawing. Continuation-in-part of application Ser. No. 610,798, Jan. 23, 1967. This application July 25, 1969, Ser. No. 845,085
Int. Cl. C09b 29/36
U.S. Cl. 260—162
7 Claims

ABSTRACT OF THE DISCLOSURE

Pyrazolyl-azo-indole compounds produce bright yellow shades on hydrophobic fibers and exhibit excellent fastness to light. The pyrazolyl diazo component is substituted with a cyano, carbamoyl, nitro or alkoxycarbonyl group on the ring carbon adjacent to the carbon atom bonded to the azo group.

---

This application is a continuation-in-part of our co-pending application Ser. No. 610,798, filed Jan. 23, 1967 for "Pyrazolylazo Cations," now abandoned.

This invention relates to certain novel azo compounds and, more particularly, to certain pyrazolylazoindole compounds which are useful for dyeing hydrophobic textile materials.

The novel pyrazolyl compounds of the invention have the general formula (I) 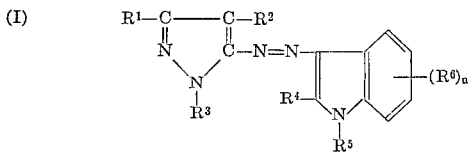

wherein $R^1$ is hydrogen, cyano or lower alkyl;
$R^2$ is cyano, carbamoyl, nitro, or lower alkoxycarbonyl;
$R^3$ is hydrogen, lower alkyl, lower hydroxyalkyl, aryl, lower alkanoyl, arylcarbonyl, lower alkylsulfonyl, or arylsulfonyl;
$R^4$ is lower alkyl or aryl;
$R^5$ is hydrogen; lower alkyl; or lower alkyl substituted with cyano, lower alkanoylamido, arylcarbonylamido, lower alkylsulfonamido, arylsulfonamido, carbamoyl, lower alkyl-NHCONH-, aryl-NHCONH-, dicarboximido, carbonyl, or aryl;
$R^6$ is hydrogen, lower alkyl, lower alkoxy, halogen, or lower alkoxycarbonyl; and
$n$ is 1 or 2.

The compounds of the invention impart bright yellow shades of excellent fastness properties to hydrophobic textile materials such as cellulose acetate, nylon and, especially, polyester fibers. For example, the novel azo compounds possess improved fastness to light when compared to the azo compounds disclosed in U.S. Pat. 3,435,022.

Methyl, ethyl, propyl, isopropyl, butyl and isobutyl are typical of the alkyl groups which $R^1$, $R^3$, $R^4$, $R^5$ and $R^6$ can represent. Examples of the alkoxy groups represented by $R^2$ and $R^6$ include methoxycarbonyl, ethoxycarbonyl, isopropoxycarbonyl, and butoxycarbonyl. 2-hydroxyethyl and 2,3-dihydroxypropyl are examples of the hydroxyalkyl groups which $R^3$ can represent. Acetyl, propionyl, butyryl, methylsulfonyl, ethylsulfonyl, propylsulfonyl and isobutylsulfonyl are representative of the alkanoyl and alkylsulfonyl groups represented by $R^3$. The aryl groups represented by $R^3$ and $R^4$ and the aryl moiety of the arylcarbonyl and arylsulfonyl groups represented by $R^3$ can be unsubstittued phenyl or phenyl substituted with lower alkyl, lower alkoxy, halogen, or nitro. Phenyl, p-tolyl, p-ethoxyphenyl, o,p-dimethylphenyl, m-chlorophenyl, m-nitrophenyl, p-tolylsulfonyl, p-anisylsulfonyl, benzoyl, p-toloyl, p-bromophenylsulfonyl, m-bromobenzyl, etc. are typical of such aryl, arylcarbonyl, and arylsulfonyl groups. 2-cyanoethyl, 3-acetamidopropyl, 3-butyramidopropyl, 2-carbamoylethyl, 3-benzamidopropyl, 3-butylsulfonamidopropyl, 3-phthalimidopropyl, 3-succinimidopropyl, 3-glutarimidopropyl, 3 - p - tolylsulfonamidopropyl, 2-carboxyethyl, benzyl, 2-phenylethyl, ethyl-NHCONH-propyl and phenyl-NHCONH-propyl are examples of the substituted alkyl groups represented by $R^5$. Additional examples of the aryl groups and the alkanoyl, arylcarbonyl, alkylsulfonyl, and arylsulfonyl moieties of the acylamido groups which can be present on the substituted alkyl groups represented by $R^5$ are set forth above. Methoxy, ethoxy, propoxy, and isobutoxy are typical alkoxy groups which $R^6$ can represent. Bromine and chlorine are illustrative of the halogen atoms represented by $R^6$.

A preferred group of the azo compounds of the invention have the formula

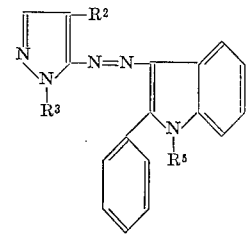

wherein $R^2$ is cyano or lower alkoxycarbonyl; $R^3$ is lower alkyl, phenyl, or phenylsulfonyl; and $R^5$ is lower alkyl, cyanoethyl, lower alkanoylamidopropyl, phenyl-NHCONH-propyl or succinimidopropyl.

The novel azo compounds are prepared by diazotizing an aminopyrazole having the formula:

(II) 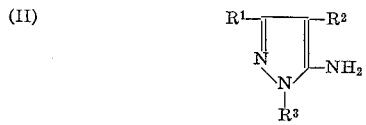

and coupling the resulting diazonium salt with an indole coupler having the formula:

(III) 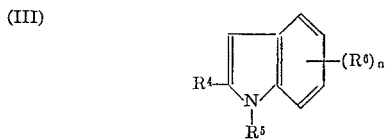

according to conventional procedures. The aminopyrazoles of Formula II are prepared according to published techniques. For example, the aminocyanopyrazoles can be obtained by reacting ethoxymethylene malanonitrile (J.A.C.S. 65, 2224) with hydrazine or a derivative thereof, i.e.

the aminocarbamoylpyrazoles are prepared by the hydrolysis of the corresponding aminocyanopyrazole; the aminoalkoxycarbonylpyrazoles can be prepared by the reaction of an ethoxymethylene cyanoalkylacetate (Ber., 38, 51) with

as described in Helv. Chim. Acta. 39, 4597; rearrangement of the appropriate isoxazole in the presence of a hydrazine as described in Gazz. Chim. Ital., 72, 537 (Chem. Abs., 38, 4597) gives the aminonitropyrazoles; and the aminodicyanopyrazoles are obtained by reacting tetracyanoethylene with the appropriate hydrazine as described in J. Org. Chem., 29, 1915.

Exemplary aminopyrazoles corresponding to Formula II, prepared as set forth above, which are diazotized and coupled with the indole coupling components include 3-amino-4-cyanopyrazole,
3-amino-4-nitropyrazole,
3-aminopyrazole-4-carboxamide,
3-amino-4-cyano-2-phenylpyrazole,
3-amino-4,5-dicyano-2-phenylsulfonylpyrazole,
3-amino-2-phenylpyrazole-4-carboxamide,
3-amino-4-nitro-2-phenylpyrazole,
3-amino-5-methyl-4-nitro-2-phenylpyrazole,
3-amino-4-cyano-2-methylpyrazole,
3-amino-4-cyano-2-p-toluoylpyrazole,
3-amino-4-cyano-2,β-hydroxyethylpyrazole,
3-amino-4-cyano-2-p-nitrophenylpyrazole,
3-amino-2,p-chlorophenylpyrazole-4-carboxamide,
3-amino-4-cyano-2,p-tolylpyrazole,
3-amino-4,5-dicyano-2-methylsulfonylpyrazole,
3-aminopyrazole-4-carboxylic acid methyl ester,
3-amino-2-phenylpyrazole-4-carboxylic acid methyl ester,
3-amino-2-phenylsulfonylpyrazole-4-carboxylic acid methyl ester,
3-amino-2-methylpyrazole-4-carboxylic acid methyl ester,
3-aminopyrazole-4-carboxylic acid ethyl ester,
3-aminopyrazole-4-carboxylic acid isopropyl ester,
3-amino-2-phenyl-4-carboxylic acid isopropyl ester,
3-amino-2-phenylsulfonylpyrazole-4-carboxylic acid isopropyl ester and the like.

Examples of the indole couplers include 1-methyl-2-phenylindole,
1,2-dimethylindole,
1,2-dimethyl-5-chloroindole,
2-phenylindole,
1-(3-cyanopropyl)-2-phenylindole,
1-ethyl-2-phenyl-5-ethylindole,
1-(2-cyanoethyl)-2-phenyl-6-bromoindole,
2-phenyl-1-butylindole,
1-methyl-2-phenyl-5,6-dichloroindole,
1-methyl-2-phenyl-5-ethoxyindole,
1,2-dimethyl-7-chloroindole,
1-methyl-2-phenyl-5-ethoxycarbonylindole,
1-(2-cyanoethyl)-2-phenyl-6-methoxyindole,
1-(3-succinimidopropyl)-2-ethyl-6-methoxycarbonylindole,
1-methyl-2-phenyl-5-bromoindole,
1,2-dimethyl-5-nitroindole,
1-(3-benzamidopropyl)-2-phenylindole,
1-(3-propionamidopropyl)-2-p-tolylindole, etc.

The preparation of the aminopyrazoles, the novel azo compounds and the use of the novel compounds is further illustrated in the following examples.

EXAMPLE A

Preparation of ethoxymethylene methylcyanoacetate

A mixture of methylcyanoacetate (99 g.), triethylorthoformate (148 g.) and acetic anhydride (220 g.) is heated at total reflux in a distillation flask with a twelve inch Vigreux column for three hours. Take off of refluxing vapors is begun and continued at atmospheric pressure until the head temperature reaches 120° C. After cooling, the system is put under vacuum and the product collected at 99° C./0.3 mm. after discarding a small forerun. A yield of 67.5% is obtained; the refractive index of the liquid is 1.4842 at 20° C.

EXAMPLE B

Preparation of 3-aminopyrazole-4-carboxylic acid methyl ester

Hydrazine hydrate (6.5 g.) is added slowly to a solution of ethoxymethylene methylcyanoacetate (20.2 g.) in absolute ethanol (100 ml.). A mild exothermic reaction occurs. The solution is heated six hours at reflux and then most of the solvent is distilled off. On cooling, a 96% yield of product melting at 135–136° C. is obtained.

EXAMPLE C

Preparation of 3-amino-2-phenylpyrazole-4-carboxylic acid methyl ester

Phenylhydrazine (14.04 g.) is added to a solution of ethoxymethylene methylcyanoacetate (20.2 g.) in absolute ethanol (100 ml.). After refluxing for six hours the reaction solution is cooled and the product is collected and recrystallized from absolute ethanol (100 ml.). The yield of recrystallized material is 97.5%, melting at 149.5–150.5° C.

*Analysis.*—Theory (percent): C, 60.8; H, 5.1; N, 19.3. Found (percent): C, 60.96; H, 5.41; N, 19.29.

EXAMPLE D

Preparation of ethoxymethylene isopropylcyanoacetate

This preparation is run exactly as Example A, substituting isopropylcyanoacetate for methylcyanoacetate. The product boils at 104° C./0.4 mm., $n_D^{20}$ 1.4710.

EXAMPLE E

Preparation of 3-amino-2-phenylsulfonylpyrazole-4-carboxylic acid isopropyl ester Benzenesulfonylhydrazine (13.6 g.) and ethoxymethylene isopropylcyanoacetate (14.6 g.) are dissolved in absolute ethanol (80 ml.). The solution is heated at reflux for six hours, part of the solvent is distilled off and the product is filtered off after cooling. A yield of 13.5 g. of the product, melting at 101–3° C. is obtained.

EXAMPLE F

Preparation of 3-amino-4-cyano-2-phenylsulfonylpyrazole

Benzenesulfonylhydrazide (9.35 g.) is dissolved in absolute ethanol by warming. Ethoxymethylene malononitrile (6.63 g.) is added to the solution at such a rate that a gentle boil is maintained. The reaction solution is heated for one hour after addition is completed. The product which separates on cooling is collected and dried. A 61% yield of the product, melting at 174–5° C., is obtained. Recrystallization from ethanol raises the melting point to 182–3° C.

*Analysis.*—Theory: (percent): C, 48.37; H, 3.25; N, 22.57. Found (percent): C, 48.38; H, 3.37; N, 22.47.

EXAMPLE 1

Ten ml. of 1:5 acid (1 part propionic:5 parts acetic) is added to a solution of nitrosylsulfuric acid prepare from sodium nitrite (0.72 g.) and sulfuric acid (5 ml.). The solution is cooled to 3° C. and 3-aminopyrazole-4-carboxylic acid methyl ester (1.41 g.) is added below 5° C. followed by a second portion of 1:5 acid (10 ml.) at the same temperature. The diazotization is completed by stirring for two hours at 3–5° C. This diazo solution is added to a cooled solution of 1-methyl-2-phenylindole (2.07 g.) in 1:5 acid (15 ml.). The mineral acid is neutralized by the addition of solid ammonium acetate maintaining the temperature at 10° C. or below. When the coupling is complete, water (500 ml.) is added with good stirring. The precipitated yellow product, 3-(4-methoxycarbonyl-3-pyrazolylazo)-1-methyl-2-phenylindole, is collected and washed well with water. The azo product produces bright yellow shades on polyester fibers.

EXAMPLE 2

3-amino-2-phenylsulfonylpyrazole - 4 - carboxylic acid isopropyl ester (3.09 g.) is diazotized as described in Example 1. The diazo solution is added to a cooled solution of 2-phenylindole (1.93 g.) in 1:5 acid (20 ml.). The coupling mixture is neutralized by addition of solid ammonium acetate keeping the temperature at 10° C. or below. When coupling is complete the azo compound, 3-(4 - isopropoxycarbonyl - 2 - phenylsulfonyl-3-pyrazolylazo)-1-methyl-2-phenylindole, is isolated by drowning in water, filtering, washing and drying. The azo compound obtained imparts fast yellow shades to polyester fibers.

EXAMPLE 3

3-amino - 4 - cyano-2-ethylpyrazole (1.37 g.) is diazotized and coupled with 1,β-cyanoethyl - 2 - phenylindole (2.45 g.) in 1:5 acid solution as described in Example 1. The resulting azo compound, 3 - (4-cyano-2-ethyl-3-pyrazolylazo) - 1 - (2-cyanoethyl)-2-phenylindole produces yellow shades of excellent fastness to light on polyester fibers.

EXAMPLE 4

1:5 acid (10 ml.) is added, below 20° C., to a solution of nitrosylsulfuric acid prepared from $NaNO_2$ (0.72 g.) and $H_2SO_4$ (5 ml.). 5 - amino-4-carbomethoxy-1-phenylpyrazole (2.18 g.) is added keeping the temperature below 5° C. After addition of a second portion of 1:5 acid (10 ml.) at the same temperature, the diazotization is completed by stirring for 2 hours at 3–5° C. This diazo solution is added to a cooled solution of 1-methyl-2-phenylindole (2.07 g.) in 1:5 acid (15 ml.). The mineral acid is neutralized by portionwise addition of solid $NH_4OAc$ keeping the temperature below 10° C. when coupling was complete, as indicated by an R-salt test, water (500 ml.) is added and the product collected on a filter, washed well with water and dried at room temperature. The product, 3-(4-methoxycarbonyl - 2 - phenyl - 3 - pyrazolylazo)-1-methyl-2-phenylindole, imparts fast yellow shades to fibers of cellulose esters, polyesters and polyamides.

The azo compounds of the examples of the following table are obtained by the procedures described in Examples 1 and 4, using the appropriate aminopyrazoles and indoles. The compounds disclosed in the table give yellow dyeings on polyester fibers and conform to Formula I.

The compounds of the invention can be used for dyeing hydrophobic textile materials in the manner described in U.S. 2,880,050, 2,757,064, 2,782,187 and 3,043,827. The following example illustrates one method by which the azo compounds of the invention can be applied to polyester textile materials.

EXAMPLE 33

The azo compound of Example 4 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for removal of residual carrier) for 5 minutes at 350° C.

The compounds of the invention can also be applied to polyester textile materials by the heat fixation technique edscribed in U.S. Pat. 2,663,612 and in the American Dyestuff Reporter, 42, 1 (1953). Polyamide fibers can be dyed with the azo compounds by the dyeing method described above except that no carrier is necessary. The above dyeing procedure also can be used for applying the azo compounds of the invention to cellulose acetate fibers except that the carrier is omitted and the dyeing is carried out at 80° C.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. The novel azo compounds have been found to give excellent dyeings on carpets containing poly(1,4 - cyclohexylenedimethylene terephthalate) fiber. Polyesters prepared from cyclohexanedimethanol and dimethylterephthalate are more particularly described in U.S. Pat. 2,901,446. Poly(ethylene terephthalate) poly-

| Ex. No. | $R^1$ | $R^2$ | $R^3$ | $R^4$ | $R^5$ | $R^6$ |
|---|---|---|---|---|---|---|
| 5  | H | —CN | H | —$C_6H_5$ | —$CH_3$ | H |
| 6  | H | —CN | H | —$C_6H_5$ | —$CH_2CH_2CN$ | H |
| 7  | —CN | —CN | —$SO_2C_6H_5$ | —$C_6H_5$ | —$CH_2CH_2CN$ | H |
| 8  | H | —$COOCH_3$ | —$SO_2C_6H_5$ | —$C_6H_5$ | —$CH_3$ | H |
| 9  | H | —$COOCH_3$ | H | —$CH_3$ | —$CH_3$ | 5-$NO_2$ |
| 10 | H | —$COOCH_3$ | H | —$C_6H_5$ | H | H |
| 11 | H | —$COOCH_3$ | H | —$CH_3$ | —$CH_3$ | H |
| 12 | H | —$COOCH_3$ | H | —$C_6H_5$ | —$CH_2CH_2CN$ | H |
| 13 | H | —CN | —$CH_2CH_2OH$ | —$C_6H_5$ | —$CH_3$ | H |
| 14 | H | —$COOCH_3$ | H | —$CH_3$ | —$CH_3$ | H |
| 15 | H | —$COOCH(CH_3)_2$ | —$SO_2C_6H_5$ | —$C_6H_5$ | —$CH_3$ | H |
| 16 | H | —$COOCH(CH_3)_2$ | —$SO_2C_6H_5$ | —$CH_3$ | —$CH_3$ | H |
| 17 | —$CH_3$ | —CN | —$C_6H_5$ | —$C_6H_5$ | —$CH_3$ | H |
| 18 | H | —$CONH_2$ | —$C_6H_5$ | —$C_6H_5$ | —$CH_2CH_2CN$ | H |
| 19 | H | —$NO_2$ | —$C_6H_5$ | —$C_6H_5$ | —$CH_3$ | H |
| 20 | H | —CN | —$C_6H_5$ | —$C_6H_5$ | —$(CH_2)_3$—$\overline{NCOCH_2CH_2CO}$ | H |
| 21 | H | —CN | H | —$C_6H_5$ | —$CH_3$ | 5-Cl |
| 22 | H | —CN | —$SO_2C_6H_4$-p-$CH_3$ | —$C_6H_5$ | —$C_2H_5$ | H |
| 23 | H | —CN | —$COC_6H_5$ | —$C_6H_5$ | —$(CH_2)_3NHCOCH_3$ | 5-$COOC_2H_5$ |
| 24 | H | —$COOC_2H_5$ | —$SO_2C_2H_5$ | —$C_6H_4$-p-$OCH_3$ | —$(CH_2)_3NHSO_2CH_2$ | H |
| 25 | H | —$NO_2$ | —$COC_6H_4$-p-Cl | —$CH_3$ | —$(CH_2)_3\overline{NCO}$-o-$C_6H_4\overline{CO}$ | H |
| 26 | H | —$NO_2$ | —$COCH_3$ | —$C_6H_5$ | —$(CH_2)_3NHCOC_6H_5$ | H |
| 27 | H | —CN | —$SO_2C_6H_4$-p-Br | —$C_6H_5$ | —$(CH_2)_3NHSO_2$—$C_6H_4$-p-$CH_3$ | H |
| 28 | H | —CN | —$SO_2C_6H_5$ | —$C_6H_5$ | —$(CH_2)_3NHCONHC_6H_5$ | H |
| 29 | H | —$COOCH_3$ | —$C_6H_5$ | —$C_6H_5$ | —$CH_2CH_2CONH_2$ | H |
| 30 | H | —$COOCH_3$ | —$CH_2CH(CH_3)_2$ | —$C_6H_5$ | —$CH_2C_6H_5$ | 6-$OCH_3$ |
| 31 | H | —$COOCH_3$ | —$C_6H_5$ | —$C_6H_5$ | —$CH_2CH_2COOH$ | H |
| 32 | H | —$COOCH_3$ | —$C_6H_5$ | —$C_6H_5$ | —$(CH_2)_3\overline{NCOCH_2CH_2CO}$ | H |
| 33 | H | —CN | —$SO_2C_6H_5$ | —$C_6H_5$ | —$CH_3$ | H |
| 34 | H | —CN | —$C_6H_5$ | —$C_6H_5$ | —$CH_3$ | H |
| 35 | H | —CN | —$C_6H_5$ | —$C_6H_5$ | —$(CH_2)_3NHCOCH_3$ | H | ester fibers are described, for example, in U.S. Patent 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane.

Examples of the polyamide fibers that can be dyed with the compounds of the invention are those consisting of nylon 66, nylon 6 and nylon 8. The cellulose acetate fibers that can be dyed include fibers having a basis of either cellulose triacetate of partially hydrolyzed cellulose acetate.

The invention has been described in detail with particular reference to preferred embodiments thereof, but it will be understood that variations and modifications can be effected within the spirit and scope of the invention.

We claim:

1. A compound having the formula

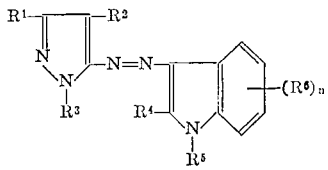

wherein $R^1$ is hydrogen, cyano or lower alkyl;
$R^2$ is cyano, carbamoyl, nitro, or lower alkoxycarbonyl;
$R^3$ is hydrogen, lower alkyl, lower hydroxyalkyl, lower alkanoyl, lower alkylsulfonyl, aryl, arylcarbonyl or arylsulfonyl;
$R^4$ is lower alkyl or aryl;
$R^5$ is hydrogen; lower alkyl; or lower alkyl substituted with cyano, lower alkanoylamido, lower alkylsulfonamido, carbamoyl, lower alkyl-NHCONH-, succinimido, glutarimido, phthalimido, carboxyl, aryl, arylcarbonylamino, arylsulfonamido, or aryl-NHCONH-;
$R^6$ is hydrogen, lower alkyl, lower alkoxy, chlorine, bromine or lower alkoxycarbonyl; and
$n$ is 1 or 2;

and wherein each aryl group is phenyl or phenyl substituted with lower alkyl, lower alkoxy, chlorine, bromine, or nitro.

2. A compound according to claim 1 having the formula

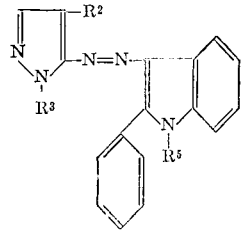

wherein $R^2$ is cyano or lower alkoxycarbonyl;
$R^3$ is lower alkyl, phenyl or phenylsulfonyl; and
$R^5$ is lower alkyl, cyanoethyl, lower alkanoylamidopropyl, phenyl-NHCONH-propyl, or succinimidopropyl.

3. A compound according to claim 1 having the formula

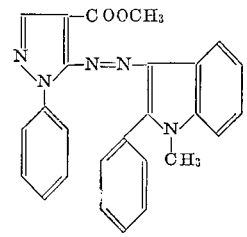

4. A compound according to claim 1 having the formula

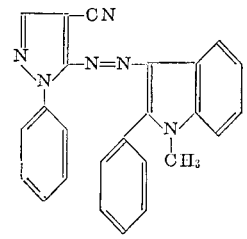

5. A compound according to claim 1 having the formula

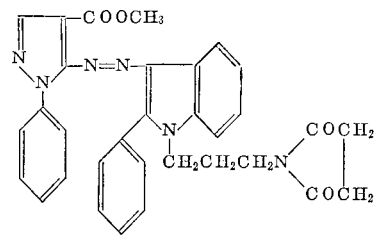

6. A compound according to claim 1 having the formula

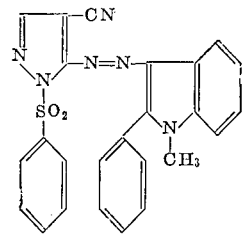

7. A compound according to claim 1 having the formula

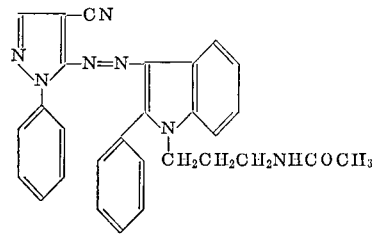

References Cited

UNITED STATES PATENTS 3,435,022  3/1969  Voltz _____ 260—147

CHARLES B. PARKER, Primary Examiner

D. M. PAPUGA, Assistant Examiner

U.S. Cl. X.R.

260—310 C, 310 R, 319.1, 326.13, 326.14